(12) United States Patent
Oka et al.

(10) Patent No.: US 10,063,166 B2
(45) Date of Patent: Aug. 28, 2018

(54) MOTOR DRIVING SYSTEM, MOTOR DRIVING DEVICE, MULTI-AXIS MOTOR DRIVING SYSTEM, AND MULTI-AXIS MOTOR DRIVING DEVICE

(71) Applicant: KABUSHIKI KAISHA YASKAWA DENKI, Kitakyushu-shi (JP)

(72) Inventors: Yusuke Oka, Kitakyushu (JP); Tadashi Okubo, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 298 days.

(21) Appl. No.: 14/934,151

(22) Filed: Nov. 6, 2015

(65) Prior Publication Data
US 2016/0065099 A1 Mar. 3, 2016

Related U.S. Application Data

(63) Continuation of application No. PCT/JP2013/063076, filed on May 9, 2013.

(51) Int. Cl.
*H02K 29/08* (2006.01)
*H02P 5/74* (2006.01)
(Continued)

(52) U.S. Cl.
CPC .......... *H02P 5/74* (2013.01); *G01D 5/20* (2013.01); *H02P 5/50* (2013.01); *H02P 29/0241* (2016.02); *H02P 6/16* (2013.01)

(58) Field of Classification Search
CPC ..... E06B 2009/2625; E06B 2009/6817; E06B 2009/6872; E06B 9/32; E06B 9/322
See application file for complete search history.

(56) References Cited

U.S. PATENT DOCUMENTS 6,188,194 B1 2/2001 Watanabe et al.
2004/0257027 A1 12/2004 Matsuo et al.
(Continued)

FOREIGN PATENT DOCUMENTS

JP 2000-181521 6/2000
JP 2002-153098 5/2002
(Continued)

OTHER PUBLICATIONS

Translation of JP183460 is attached.*
(Continued)

*Primary Examiner* — Shawki S Ismail
*Assistant Examiner* — Zoheb Imtiaz
(74) *Attorney, Agent, or Firm* — Mori & Ward, LLP

(57) ABSTRACT

This disclosure discloses a motor driving system including a motor with an encoder and a motor driving device configured to control and drive the motor based on a motor control command. The motor driving device includes a first position detection unit configured to perform a magnetic pole position detection process for the motor to detect a position of the motor. When determining whether miswiring is present between the motor driving device and the motor, the motor driving device controls and drives the motor using a first detection result of the first position detection unit and determines miswiring of the motor based on a second detection result that is a position detection result of the motor by the encoder.

15 Claims, 5 Drawing Sheets

(51) Int. Cl.
*H02P 5/50* (2016.01)
*G01D 5/20* (2006.01)
*H02P 29/024* (2016.01)
*H02P 6/16* (2016.01)

(56) References Cited

U.S. PATENT DOCUMENTS

| 2010/0171455 | A1 | 7/2010 | Schulz et al. |
| 2012/0217921 | A1 | 8/2012 | Wu et al. |
| 2012/0249025 | A1* | 10/2012 | Okita ............... H02P 6/18 318/400.02 |
| 2014/0097859 | A1 | 4/2014 | Matsumura et al. |

FOREIGN PATENT DOCUMENTS

| JP | 2005-012997 | | 1/2005 |
| JP | 2010-213557 | | 9/2010 |
| JP | 2011-183460 | * | 9/2011 |
| JP | 2013-052456 | | 3/2013 |
| WO | WO 2012/172647 | | 12/2012 |

OTHER PUBLICATIONS

Chinese Office Action for corresponding CN Application No. 201380076363.7, dated Jan. 20, 2017.
International Preliminary Report on Patentability with Translation of Written Opinion of the International Searching Authority for corresponding International Application No. PCT/JP2013/063076, dated Nov. 19, 2015.
Japanese Office Action for corresponding JP Application No. 2015-515706, Jul. 4, 2016.
Extended European Search Report for corresponding EP Application No. 13884163.0-1806, dated May 4, 2017.
International Search Report for corresponding International Application No. PCT/JP2013/063076, dated Aug. 13, 2013.
Written Opinion for corresponding International Application No. PCT/JP2013/063076, dated Aug. 13, 2013.

* cited by examiner

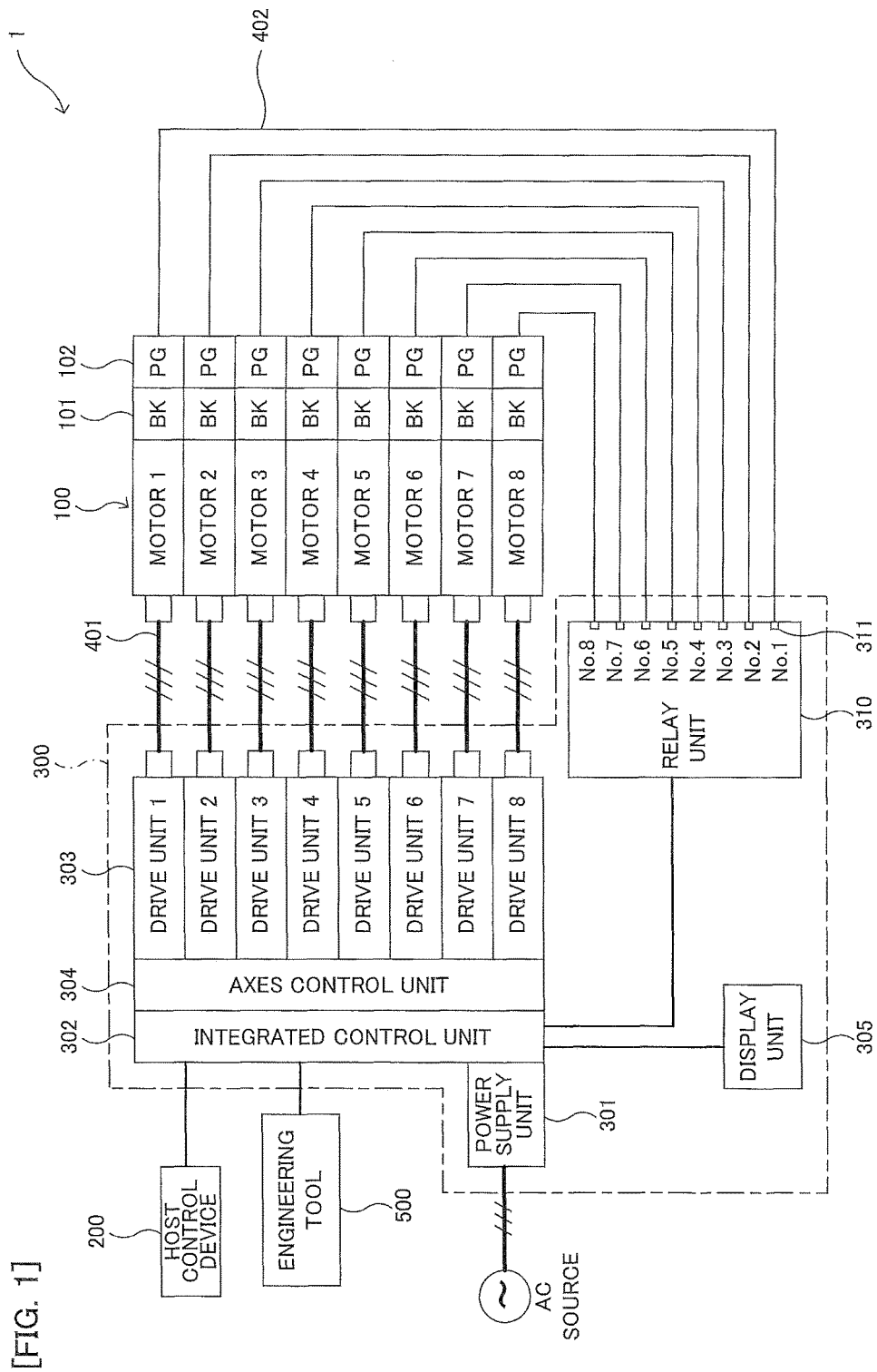
[FIG. 1]

[FIG. 2]
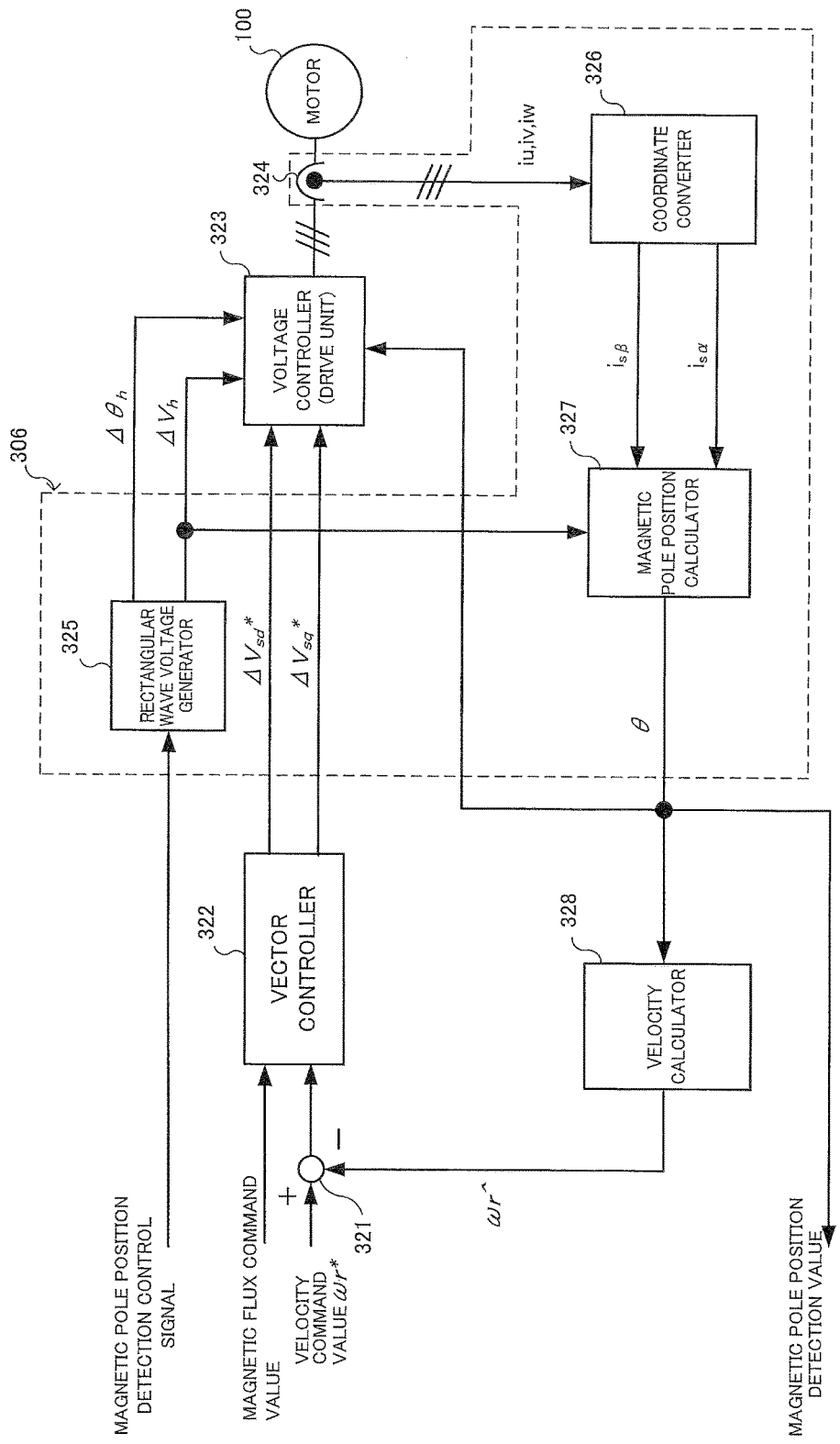

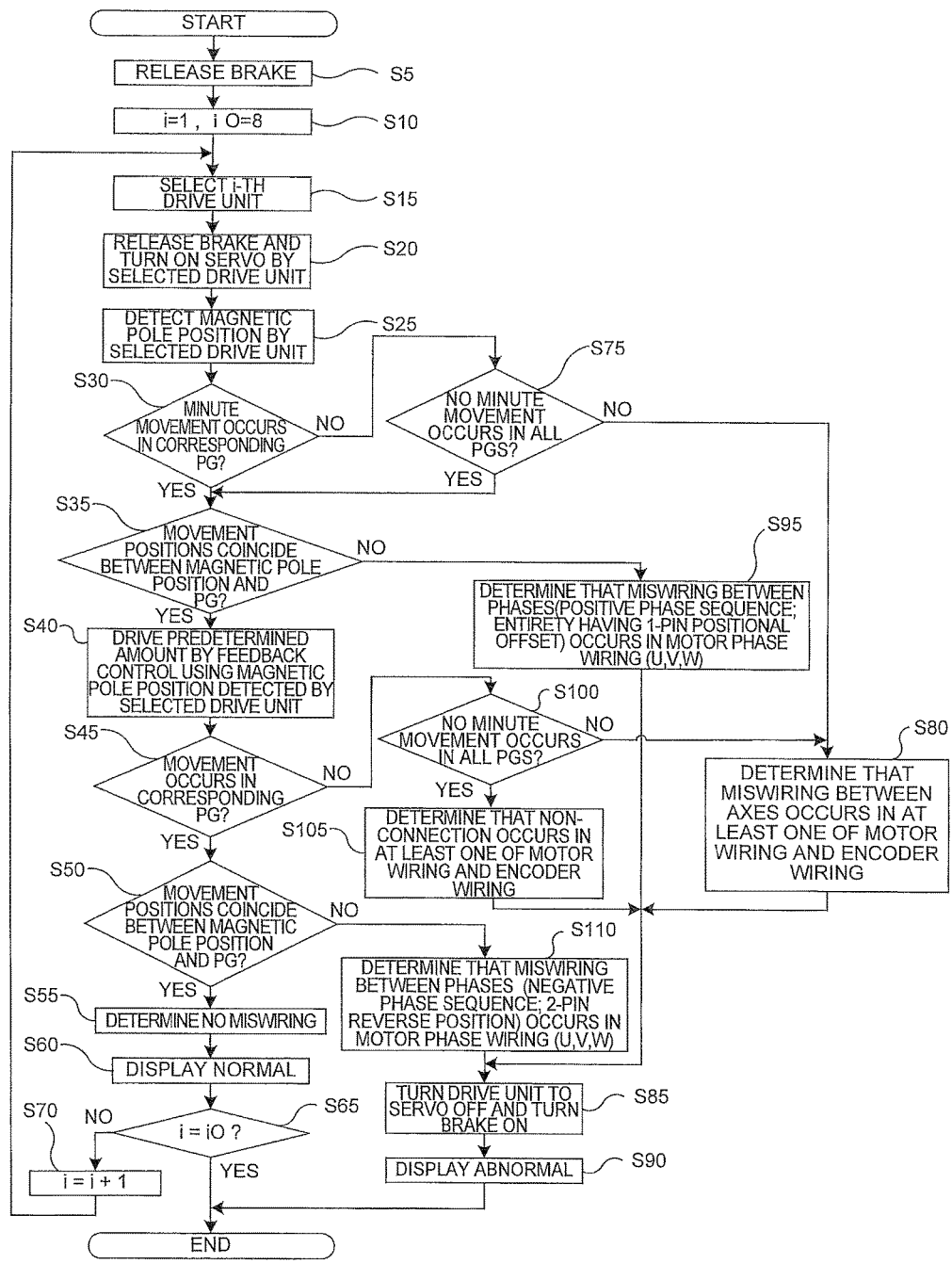
[FIG. 3]

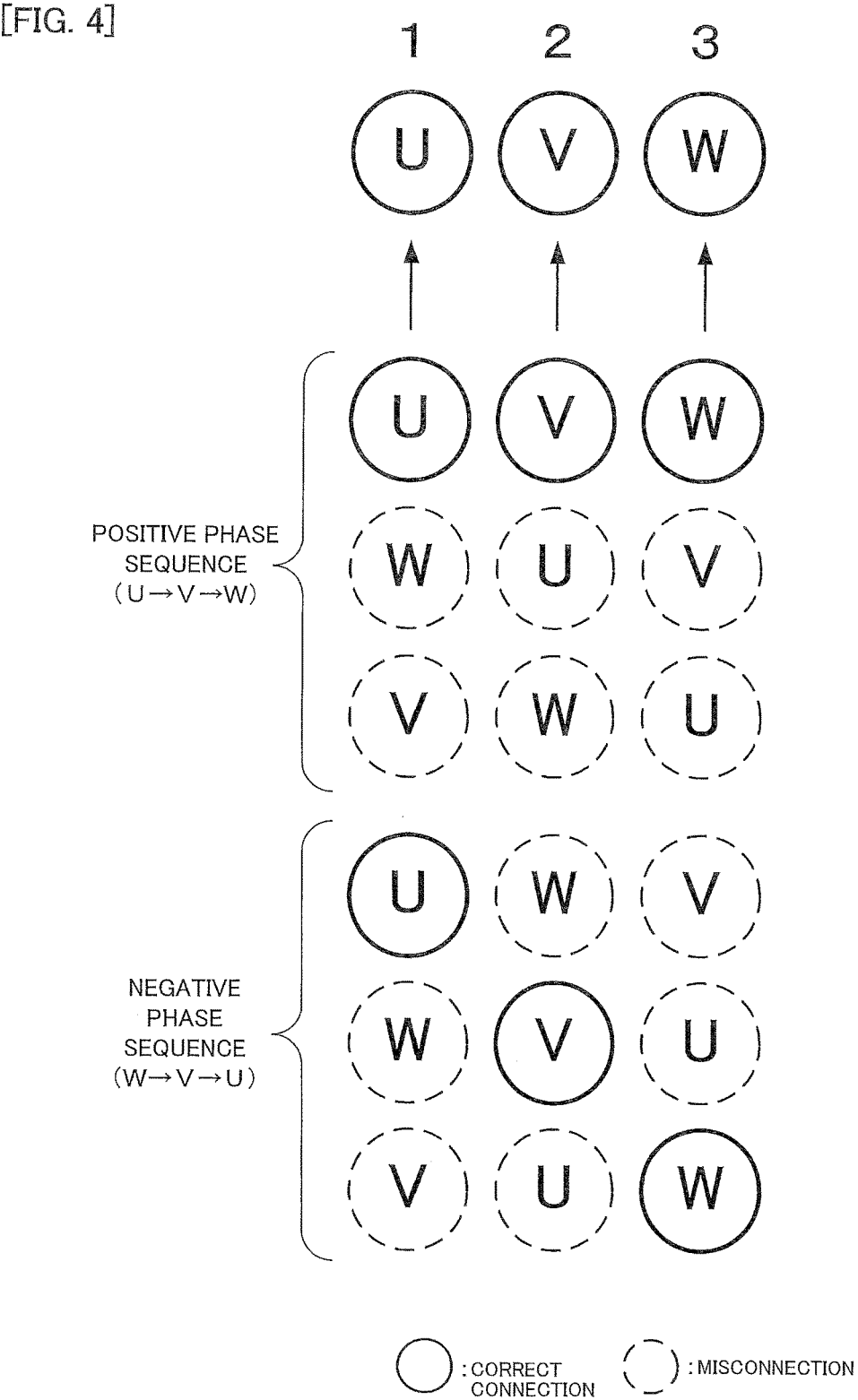
[FIG. 4]

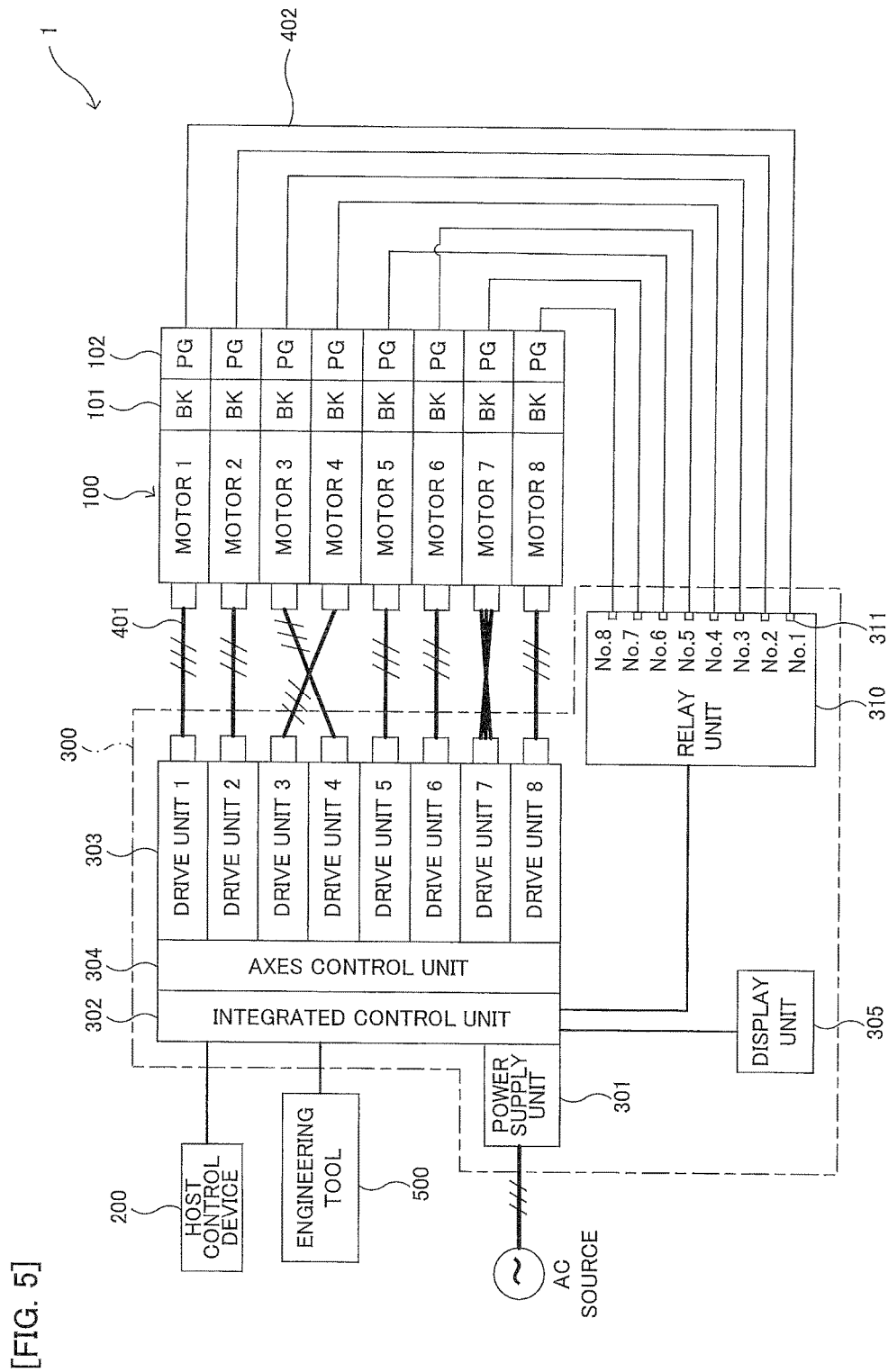
[FIG. 5]

MOTOR DRIVING SYSTEM, MOTOR DRIVING DEVICE, MULTI-AXIS MOTOR DRIVING SYSTEM, AND MULTI-AXIS MOTOR DRIVING DEVICE

CROSS-REFERENCE TO RELATED APPLICATION

This is a continuation application PCT/JP2013/063076, filed May 9, 2013, which was published under PCT article 21(2) in English.

TECHNICAL FIELD

A disclosed embodiment relates to a multi-axis motor driving system driving a plurality of motors, and a multi-axis motor driving device included therein.

BACKGROUND

A control device that contributes to avoiding a risk due to an abnormal motion immediately after the start of an automatic machine with a plurality of servo-controlled axes, as well as to eliminating the cause thereof is known.

SUMMARY

According to one aspect of the disclosure, there is provided a motor driving system including a motor with an encoder and a motor driving device configured to control and drive the motor based on a motor control command. The motor driving device includes a first position detection unit configured to perform a magnetic pole position detection process for the motor to detect a position of the motor. When determining whether miswiring is present between the motor driving device and the motor, the motor driving device controls and drives the motor using a first detection result of the first position detection unit and determines miswiring of the motor based on a second detection result that is a position detection result of the motor by the encoder.

BRIEF DESCRIPTION OF THE DRAWINGS

FIG. 1 is a diagram showing a system configuration in the case that a multi-axis motor driving system of an embodiment is properly wired.

FIG. 2 is a control block diagram showing an example of the configuration of a magnetic pole position detection unit included in an axes control unit.

FIG. 3 is a flowchart representing the content of control executed by an integrated control unit at the time of setting up of the multi-axis motor driving system.

FIG. 4 is a diagram explaining the type of miswiring between phases.

FIG. 5 is a system configuration diagram conceptually representing the configuration of the multi-axis motor driving system, representing an example of miswiring of the multi-axis motor driving system.

DESCRIPTION OF THE EMBODIMENTS

An embodiment will now be described with reference to the drawings.

FIG. 1 is a diagram showing a system configuration in the case that a multi-axis motor driving system 1 of this embodiment is properly wired. As shown in FIG. 1, the multi-axis motor driving system 1 includes a plurality of (eight in this example) rotary motors 100 and a multi-axis motor driving device 300 that drives the motors 100 based on a motor control command input from a separate host control device 200. In this example, the motors 100 are rotation-type permanent magnet synchronous motors driven by three-phase AC power, each having a brake 101 and an encoder 102 that detects a velocity (angular velocity) and a position (angle) of the rotation axis to output the detection signal as a feedback pulse to the multi-axis motor driving device 300. In one motor 100, the brake 101 and the encoder 102 are previously integrally assembled into one component so that axis-to-axis correspondences match at all times. The motor 100 may be a motor not having the brake 101.

The multi-axis motor driving device 300 has a power supply unit 301 receiving AC power; an integrated control unit 302 providing control of communication with a host control device 200 and overall control of the multi-axis motor driving device 300; a plurality of (eight in this example) drive units 303 each connected individually to a corresponding one of the motors 100 via motor wiring 401 to supply power to and drive the motor 100; and an axes control unit 304 controlling the plurality of drive units 303. The axes control unit 304 includes magnetic pole position detection units each corresponding to each of the drive units 303, each magnetic pole position detection unit being capable of detecting a magnetic pole position of corresponding one of the motors 100 via each drive unit 303 to thereby detect a position (angle) of the motor 100 (see FIG. 2 described later). The integrated control unit 302 and the axes control unit 304 are equivalent to an example of a control unit described in claims. The host control device 200 may be configured integrally with the integrated control unit 302.

Hereinafter, the eight drive units 303 are referred to properly as first to eighth drive units 303, and the motors 100 corresponding respectively to the first to eighth drive units 303 are referred to properly as first to eighth motors 100. The motor wirings 401 connecting respectively the first to eighth drive units 303 and the first to eighth motors 100 corresponding thereto are referred to properly as first to eighth motor wirings 401.

The multi-axis motor driving device 300 has a relay unit 310 relaying positions detected by the encoders 102 to the integrated control unit 302. The relay unit 310 is configured from a substrate, a module, or the like and is disposed integrally with the multi-axis motor driving device 300. The relay unit 310 may be configured separately from the multi-axis motor driving device 300. This relay unit 310 has a plurality of (eight in this example) connectors 311 to which encoder wirings 402 from the encoders 102 are connected, the connectors 311 corresponding to the first to eighth motors 100, respectively.

Hereinafter, the connectors 311 corresponding to the first to eighth motors 100, respectively, are referred to as first to eighth connectors 311, and the encoder wirings 402 connecting the encoders 102 of the first to eighth motors 100 and the first to eighth connectors 311 corresponding thereto, respectively, are referred to properly as the first to eighth encoder wirings 402. Without having the relay unit 310, configuration may be such that the wirings from the encoders 102 are connected to the first to eighth connectors 311 disposed directly on the integrated control unit 302. The encoders 102 of the first to eighth motors 100 are equivalent to an example of a second position detection unit described in claims, the first to eighth connectors 311 are equivalent to an example of a signal input unit described in claims, and the first to eighth encoder wirings 402 are equivalent to an example of a signal input unit wiring described in claims.

A detection signal from each encoder 102 is input via the relay unit 310 to the integrated control unit 302. This integrated control unit 302 supplies power viva the drive units 303 to the motors 100 in sequence while referring to motor positions detected by the magnetic pole position detection units, and, based on detection signals of the encoders 102 from the relay unit 310 at that time, determines the presence or absence of miswiring in at least one of the motor wirings 401 connecting the drive units 303 and the motors 100 and the encoder wirings 402 connecting the encoders 102 and the connectors 311, for each of the drive units 303. Herein, miswiring in the motor wirings 401 includes: the case where miswiring is present in wirings of phases (U-phase, V-phase, W-phase) of the motor wirings 401 (e.g., the case where corresponding phases are not connected to each other between the drive units 303 and the motors 100, hereinafter referred to properly as miswiring between phases); and miswiring due to connections of the drive units 303 and the motors 100 that do not correspond to each other (e.g., the case where the third drive unit 303 and the fourth motor 100 are connected; hereinafter referred to properly as miswiring between axes). Miswiring in the encoder wiring 402 includes miswiring due to connections of the encoders 102 and the connectors 311 that do not correspond to each other (e.g., the case where the encoder 102 of the fifth motor 100 and the sixth connector 311 are connected; hereinafter also referred to properly as miswiring between axes).

An engineering tool 500 is connected to the multi-axis motor driving device 300. This engineering tool 500 is in the form of a portable handy controller for example and allows the operator to input various commands, data, etc. The multi-axis motor driving device 300 has a display unit 305 such as a liquid crystal panel. This display unit 305 displays various pieces of information including the result of determination by the integrated control unit 302. Configuration may be such that the multi-axis motor driving device 300 does not have the display unit 305 but provides various indications by an externally disposed display device (e.g., a PC display) or by a display unit of the engineering tool 500.

An example of the configuration of the magnetic pole position detection units included in the axes control unit 304 will then be described with reference to a control block diagram of FIG. 2. The control block diagram shown in FIG. 2 is expressed by transfer function form, this configuration being arranged correspondingly to each of the drive units 303. In FIG. 2, a subtracter 321, a vector controller 322, a voltage controller 323, the motor 100, a current detector 324, a rectangular wave voltage generator 325, a coordinate converter 326, a magnetic pole position calculator 327, and a velocity calculator 328 are shown. Among them, part of the voltage controller 323 is equivalent to the drive units 303, while the rectangular wave voltage generator 325, the current detector 324, the coordinate converter 326, the magnetic pole position calculator 327 make up the magnetic pole position detection unit 306. This magnetic pole position detection unit 306 is equivalent to an example of a first position detection unit described in claims. The subtracter 321 and the vector controller 322 make up part of the axes control unit 304.

A magnetic flux command value and a velocity command value $\omega r^*$ for controlling the drive of the motors 100 are input from part of the axes control unit 304 not shown in FIG. 2. The subtracter 321 finds a deviation between the velocity command value $\omega r^*$ and a velocity estimate value $\omega r\hat{}$ described later. This deviation and the magnetic flux command value are input to the vector controller 322. The vector controller 322 defines a magnetic flux component (d-axis component) and a torque component (q-axis component) of the motor current so that the velocity estimate value $\omega r\hat{}$ coincides with velocity command value $\omega r^*$ irrespective of the load state, and outputs voltage command values for controlling the velocity of the motor 100 and the current in the form of 2-phase voltage command values $\Delta Vsd^*$ and $\Delta Vsq^*$ in the rotation orthogonal coordinate system (d-q axes coordinate system). The voltage controller 323 outputs a 3-phase drive voltage to the motors 100, based on the input 2-phase voltage command values $\Delta Vsd^*$ and $\Delta Vsq^*$. This enables the motors 100 to be drive-controlled by any velocity and torque (although position control is also carried out, it is not shown).

On the other hand, a magnetic pole position detection control signal is input from a portion not shown of the axes control unit 304 to the rectangular wave voltage generator 325. When receiving the magnetic pole position detection control signal, the rectangular wave voltage generator 325 issues a voltage command $\Delta Vh$ and a phase command $\Delta\theta h$ at a rectangular wave voltage (pulse wave voltage) with an optionally set time period. These voltage command $\Delta Vh$ and phase command $\Delta\theta h$ are superimposed on the 2-phase voltage command values $\Delta Vsd^*$ and $\Delta Vsq^*$ in the voltage controller 323, to operate the amplitude and the phase of the voltage to be output to the motors 100.

The current detector 324 detects a current input to the motors 100 in three phases iu, iv, and iw, respectively. These 3-phase current values iu, iv, and iw are converted into 2-phase current values is$\alpha$ and is$\beta$. These 2-phase current values is$\alpha$ and is$\beta$ are current values of axes in an orthogonal coordinate system in which u-phase is an $\alpha$ axis as a reference axis that is orthogonal to a $\beta$ axis. Here, if a deviation is present between respective inductances of a d-axis and a q-axis of the motor 100, that is, if that motor 100 has a magnetic saliency, the amplitudes of these 2-phase current values is$\alpha$ and is$\beta$ contain information of a magnetic pole position $\theta$. The magnetic pole position calculator 327 calculates and issues the magnetic pole position $\theta$ of the motor 100 based on the 2-phase current values is$\alpha$ and is$\beta$, while referring to the voltage command $\Delta Vh$ output from the rectangular wave voltage generator 325. A calculation technique of this magnetic pole position $\theta$ may be effected in accordance with the known technique (see, e.g., JP, A, 2010-172080) and will not again be described in detail herein. An example of the motor 100 having the magnetic saliency includes a synchronous motor incorporating a permanent magnet used in this embodiment, a synchronous reluctance motor, or an induction motor having an inductance variation due to magnetic saturation.

The magnetic pole position signal $\theta$ output from the magnetic pole position calculator 327 is input to the voltage controller 323 and also to the velocity calculator 328. The velocity calculator 328 subjects the magnetic pole position $\theta$ to a differential operation to obtain an estimate velocity $\omega r\hat{}$ of the motor 100. This velocity estimate value $\omega r\hat{}$ is subtracted from the velocity command value $\omega r^*$ to obtain a deviation, which in turn is utilized for the velocity feedback control. Although not shown, the magnetic pole position $\theta$ may be regarded as a rotation position of the motor 100 with the U-phase magnetic pole position as a reference, and the axes control unit 304 performs position feedback control as well utilizing this magnetic pole position signal $\theta$ therewithin.

As described above, in the multi-axis motor driving system of this embodiment, two kinds of motor position detections including a mechanical position detection by the respective encoders 102 and an electrical position detection by the magnetic pole position detection units 306 are possible for the motors 100. However, in the case that miswiring between axes (axis-to-axis miswiring) is present in the motor wirings 401 between the drive units 303 and the motors 100 or in the encoder wirings 402 between the encoders 102 and the connectors 311, if the axes control unit 304 performs the drive control of the motors 100 based on the motor positions detected by the encoders 102, based on detected positions of unintended motors 100, the other motors 100 may be drive-controlled or drive power may be supplied to unintended motors 100, leading to a cause to allow the unintended motors 100 to perform unintended motions.

In contrast, the magnetic pole position detection unit 306 can perform detection of the position of a motor 100 actually connected to a drive unit 303 at that point of time, from that drive unit 303 side. For this reason, if the axes control unit 304 performs drive control such as positioning control based on the magnetic pole position signal θ, securely proper drive control can be provided for the motor 100 actually connected to the drive unit 303. In other words, even if miswiring between axes is present in the motor wirings 401 or in the encoder wirings 402, unintended motions can be prevented in any of the motors 100. The feedback control using the magnetic pole position signal θ is characterized in that the motors 100 can be controlled in a relatively stable manner even if there is miswiring between phases in the motor wirings 401.

Thus, the multi-axis motor driving system 1 of this embodiment controls the drive of the motors 100 by the feedback control (so-called encoderless control) using the magnetic pole position signal θ when determining miswiring, and determines whether miswiring is present based on the detection results of the encoders 102 (or by the comparison with the magnetic pole position signal θ). The detection results (magnetic pole positions θ) of the magnetic pole position detection units 306 are equivalent to an example of a first detection result described in claims, and the detection results of the encoders 102 are equivalent to an example of a second detection result described in claims.

The content of control executed by the integrated control unit 302 during the wiring check of the multi-axis motor driving system 1 will next be described with reference to FIG. 3. The integrated control unit 302 starts the flow shown in FIG. 3 when the multi-axis motor driving device 300 is powered on for example. Assume that before the power-on, the arrangement of the motor wirings 401 and the encoder wirings 402 is completed irrespective of whether miswiring is present. Also assume that the engineering tool 500 is previously connected to the multi-axis motor driving device 300 and is powered on.

At step S5, the integrated control unit 302 releases the brake function by a so-called dynamic brake (not shown, details omitted) of all of the motors 100 connected to the multi-axis motor driving device 300.

Next, the procedure goes to step S10 where the integrated control unit 302 initializes a variable i for counting the number of the drive units 303 to 1 and sets iO representing the number of all drive units to a predetermined value. Since the number of the drive units 303 is eight in all in the example of FIG. 1, iO=8. The value of iO is manually input via the engineering tool 500 by the operator. The value of iO may be decided by automatically recognizing the number of the drive units 303 connected to the integrated control unit 302 when power is turned on.

Next, the procedure goes to step S15 where the integrated control unit 302 selects one drive unit 303 from among a plurality of drive units 303 included in the multi-axis motor driving device 300. In the example shown in FIG. 1 for example, an i-th drive unit 303 is selected in sequence such that the first drive unit 303 is selected for i=1 and the second drive unit 303 for i=2.

Next, the procedure goes to step S20 where the integrated control unit 302 releases the brake function of the brake 101 of the motor 100 connected to the drive unit 303 selected at step S15 and starts power supply from that drive unit 303 to the motor 100, to generate a servo-on state. Since in this servo-on state, the integrated control unit 302 outputs a position command corresponding to the drive amount 0 to the axes control unit 304 and the drive unit 303 to provide a position feedback control, the motor 100 is servo-clamped while remaining positioned at the time of start of current supply and is firmly fixed at the rotational position.

Next, the procedure goes to step S25 where the integrated control unit 302 performs a magnetic pole position detection process for detecting the magnetic pole position θ of the motor 100 connected to the drive unit 303 selected at step S15 only once. More specifically, a magnetic pole position detection control signal is input only once to the rectangular wave voltage generator 325 of the magnetic pole position detection unit 306 corresponding to the selected drive unit 303 in the axes control unit 304, to detect a magnetic pole position signal θ output from the magnetic pole position calculator 327 (see FIG. 2). At this time, as a feature of the magnetic pole position detection process effected by the magnetic pole position detection unit 306, a predetermined torque occurs for an instance in the motor 100 to cause the motor 100 to perform a minute motion. The state after this minute motion is equivalent to an example of a first positioning control state described in claims.

Next, the procedure goes to step S30 where the integrated control unit 302 determines whether a minute movement of the position of the motor 100 by the magnetic pole position detection process at step S25 has been detected from the encoder 102 (abbreviated as PG in the diagram, the same shall apply hereinafter) corresponding to the drive unit 303 selected at step S15. More specifically, it is determined whether a signal indicative of a minute movement has been detected from an i-th connector 311. If the signal indicative of a minute movement has been detected from the i-th connector 311, in other words, if a minute movement has been detected from the axis, the determination is satisfied, proceeding to step S35.

At step S35, the integrated control unit 302 determines whether the motor position (position after the minute movement) indicated by the magnetic pole position signal θ detected at step S25 coincides with the motor position detected from the i-th connector 311 at step S30. If the motor position indicated by the magnetic pole position signal θ and the motor position detected at the i-th connector 311 coincide with each other, the determination is satisfied, proceeding to step S40.

At step S40, the integrated control unit 302 provides a drive control (provides a so-called encoderless position control) so as to cause a motor 100 connected to the drive unit 303 selected at step S15 to move for positioning by a predetermined amount by the position feedback control using the continuously detected magnetic pole position θ of that motor 100. The state after the positioning movement by the predetermined amount is equivalent to an example of a second positioning control state described in claims.

Next, the procedure goes to step S45 where the integrated control unit 302 determines whether a movement (movement by a predetermined amount) of the position of the motor 100 by the position feedback control at step S40 has been detected from the encoder 102 corresponding to the drive unit 303 selected at step S15. More specifically, it is determined whether a signal indicative of a movement even a little has been detected from an i-th connector 311. If the signal indicative of a movement has been detected from the i-th connector 311, in other words, if a movement has been detected from the axis, the determination is satisfied, proceeding to step S50.

At step S50, the integrated control unit 302 determines whether the motor position (motor position indicated by the magnetic pole position signal θ at that point of time) after the positioning movement at step S40 coincides with the motor position detected from the i-th connector 311 at step S45. If the motor position indicated by the magnetic pole position signal θ at that point of time and the motor position detected at the i-th connector 311 coincide with each other, the determination is satisfied, proceeding to step S55.

At step S55, the integrated control unit 302 determines that there is no miswiring in the motor wirings 401 and the encoder wirings 402.

Next, the procedure goes to step S60 where the integrated control unit 302 uses the display unit 305 to provide an indication showing that wiring related to the drive unit 303 in selection is normally done.

Next, the procedure goes to step S65 where the integrated control unit 302 determines whether the variable i coincides with the number iO of all drive units. If the variable i coincides with the number iO of all drive units, the determination is satisfied, putting an end to this flow.

If the variable i and the number iO of all drive units do not coincide, the determination is not satisfied, proceeding to step S70.

At step S70, the integrated control unit 302 adds 1 to the value of the variable i. The procedure then returns to step S15 to repeat the same process.

On the other hand, if the signal indicative of a minute movement has not been detected from the i-th connector 311 in the determination at step S30, in other words, if a minute movement of the axis has not been detected, the determination is not satisfied, proceeding to step S75.

At step S75, the integrated control unit 302 determines whether a minute movement of the position of the motor 100 by the magnetic pole position detection process at step S25 has not been detected from all the encoders 102. More specifically, it is determined whether a signal indicative of a minute movement has not been detected in all of the first to eighth connectors 311. If the signal indicative of a minute movement has not been detected from any of the first to eighth connectors 311, the determination is satisfied, allowing the procedure to go to step S35. In this case, processing is made so as to return to the main route in view of the possibility that no motor 100 could undergo a minute movement by an instantaneous torque in the magnetic pole position detection process due to a large inertial mass of a load machine connected to each of all the motors 100.

On the other hand, if a signal indicative of a minute movement has been detected from any of the first to eighth connectors 311, in other words, if a minute movement has been detected from another axis, not from the axis, the determination is not satisfied, proceeding to step S80.

At step S80, the integrated control unit 302 determines that at least one of the motor wirings 401 and the encoder wirings 402 include miswiring between axes having a connection with a device not corresponding to the selected drive unit 303.

Next, the procedure goes to step S85 where the integrated control unit 302 compulsorily stops power supply to the motor 100 from the drive unit 303 turned to servo-on state at step S 20, to put it in servo-off state, and turns on the brake function of the brakes 101 of all the motors 100 connected to the multi-axis motor driving device 300.

At next step S90, the integrated control unit 302 provides an indication to urge checking corresponding wiring, using the display unit 305. For example, if it has been determined at step S80 that miswiring is present, the integrated control unit 302 provides an indication of the name (number) of the selected drive unit 303 and an indication to urge checking miswiring between axes of the motor wiring 401 related thereto, while the integrated control unit 302 provides an indication of the name (number) of the connector 311 at which a movement has been detected and an indication to urge checking miswiring between axes of the encoder wiring related thereto. This flow is then terminated.

On the other hand, if the motor position indicated by the magnetic pole position signal θ at that point of time and the motor position detected at the i-th connector 311 do not coincide in the determination at step S35, the determination is not satisfied, proceeding to step S95.

At step S95, the integrated control unit 302 determines that miswiring between phases having a wrong connection relationship between phases (U-phase, V-phase, W-phase) is present in the motor wiring 401 between the selected drive unit 303 and the motor 100. Particularly, in this case, it can be determined that there is miswiring between phases of the type in which phases are arrayed in the positive phase sequence with a positional offset by one pin in total (description thereof will be given in detail in FIG. 4 described later). In this case, in the feedback control using the magnetic pole position signal θ as described above, the motors 100 can be controlled in a relatively stable manner even though miswiring between phases is present in the motor wirings 401, enabling an unintended motion of the motor 100 to be suppressed as much as possible. Although processes at steps S85 and S90 are then executed, in the process at step S90, the integrated control unit 302 provides an indication of the name (number) of the selected drive unit 303 and an indication to urge checking miswiring between phases of the motor wiring 401 related thereto. This flow is then terminated.

On the other hand, if a signal indicative of a movement has not been detected from the i-th connector 311 in the determination at step S45, in other words, if a movement has not been detected from the axis, the determination is not satisfied, proceeding to step S100.

At step S100, the integrated control unit 302 determines whether a movement of the position (a further movement from the position after the magnetic pole position detection process) of the motors 100 by the predetermined amount of positioning drive control at step S40 has not been detected from all the encoders 102. More specifically, it is determined whether a signal indicative of a movement has not been detected at all of the first to eighth connectors 311. If no signal indicative of a movement has been detected from all of the first to eighth connectors 311, the determination is satisfied, proceeding to step S105. In this case, it is regarded that the movement have not been detected at all although any of the motors 100 is apparently to move.

At step S105, the integrated control unit 302 determines that there is a non-connection portion in at least one of the motor wirings 401 and the encoder wirings 402, particularly, in the motor wiring 401 or the encoder wiring 402 related to the selected drive unit 303. Although the processes at steps S85 and S90 are then executed, in the process at step S90, the integrated control unit 302 provides an indication of the name (number) of the selected drive unit 303 and an indication to urge checking non-connection of the motor wiring 401 or the encoder wiring 402 related thereto. This flow is then terminated.

On the other hand, if a signal indicative of a movement has been detected from any of the first to eighth connectors 311 in the determination at step S100, in other words, if a movement has been detected from another axis, not from the axis, the determination is not satisfied, proceeding to step S80 to execute the same process.

On the other hand, if the motor position indicated by the magnetic pole position signal θ at that point of time and the motor position detected at the i-th connector 311 do not coincide in the determination at step S50, the determination is not satisfied, proceeding to step S110.

At step S110, the integrated control unit 302 determines that miswiring between phases is present in the motor wiring 401 between the selected drive unit 303 and the motor 100. Particularly, in this case, it can be determined that there is miswiring between phases of the type in which any one pin is correctly connected with the other two pins being reversely connected while the phases are arrayed in the negative phase sequence (description thereof will be given in detail in FIG. 4 described later). In this case, in the feedback control using the magnetic pole position signal θ as described above, the motors 100 can be controlled in a relatively stable manner even though miswiring between phases is present in the motor wirings 401, enabling an unintended motion of the motor 100 to be suppressed as much as possible. Although the processes at steps S85 and S90 are then executed, in the process at step S90, the integrated control unit 302 provides an indication of the name (number) of the selected drive unit 303 and an indication to urge checking miswiring between phases of the motor wiring 401 related thereto. This flow is then terminated.

In the above flow, the integrated control unit 302 performs the checking processes at steps S30 and S35 correspondingly to the control process at step S25, and performs the checking processes at steps S45 and S50 correspondingly to the control process at step S40. That is, the integrated control unit 302 performs two checking processes (four checking processes in total) correspondingly to each of the two control processes.

In the control process at step S25, the magnetic pole position detection process is performed only once for the motor 100 connected to the selected drive unit 303 as described above, to cause that motor 100 to perform a minute motion. On the other hand, at step S30, it is checked whether the motor 100 experiencing the minute motion has the axis corresponding to the drive unit 303 in selection or another axis not corresponding thereto. At step S35, the motor position based on the magnetic pole position signal θ and the motor position detected by the encoder 102 are compared and checked for the movement position after the minute motion.

Note that, as described above, there may be a possibility that the motor 100 could not make a minute movement by an instantaneous torque in the magnetic pole position detection process if the inertial mass of a load machine connected to the motor 100 is large. For this reason, in the moving axis check at step S30, even if miswiring between axes is present, the presence thereof may not be determined. However, even when the motor 100 cannot make a minute motion due to large inertial mass of the load machine, if miswiring between phases occurs in the motor wiring 401, the magnetic pole position θ detected by the magnetic pole position detection process and the motor position detected from the encoder 102 do not coincide, enabling the occurrence of miswiring between phases to be determined. It is to be noted that the miswiring between phases determinable in this case is limited to miswiring of the type in which while phases are arrayed in the positive phase sequence, their entirety is positionally offset by one pin.

The type of miswiring between phases will be described. For example, in the case of using a 3-phase AC motor 100 as in this embodiment, three phases U, V, and W are connected correspondingly to pins as shown in FIG. 4. Typically, since U-phase is the reference, a first pin, a second pin, and a third pin in the ascending order are allocated to U-phase, V-phase, and W-phase, respectively. The total number of combinations of the connection arrangement of three phases to the first to third pins is 3! when considered by the permutation, that is, 1×2×3=6. Among them, the number of combinations of the connection arrangement where the phase circulation sequence results in the positive phase sequence U→V→W relative to the ascending direction of the first to third pins is 3, among which one combination (1, 2, 3=U,V,W) is correct connection wiring free from miswiring between phases. The other two combinations of the connection arrangement in the positive phase sequence results in miswiring between phases of the type in which the entirety of the three phases is positionally offset (forward offset in the ascending order; reverse offset in the ascending order) by one pin. The miswiring between phases check at step S35 determines only the miswiring between phases (1,2,3=W,U,V, or V,W,U) of such a type in which the entirety of the three phases is positionally offset by one pin in the positive phase sequence.

In the control process at step S40, by the position feedback control at the continuously detected magnetic pole position θ of the motor 100 connected to the selected drive unit 303 as described above, the drive control is provided such that the motor 100 is moved for positioning by a predetermined mount. On the other hand, at step S45, it is checked whether the moved motor 100 has the axis corresponding to the drive unit 303 in selection or another axis not corresponding thereto. At step S50, the motor position based on the magnetic pole position signal θ and the motor position detected by the encoder 102 are compared and checked for the movement position after the positioning drive.

In this case, the check at step S45 can determine even miswiring between axes that was impossible to determine due to impossibility of a minute motion arising from large inertial mass of the load machine in the check at step S30. The check at step S50 can determine three different combinations of miswiring between phases (1,2,3=U,W,V or W,V,U or V,U,W) in the connection arrangement where the phase circulation sequence is the negative phase sequence W→N→U relative to the descending order direction of the first to third pins. These three different connection arrangements in the negative phase sequence are such that any one pin is correctly connected with the other two pins being reversely connected. This enables all combinations of miswiring to be determined without exception by the two checks at steps S35 and S50.

A specific example of miswiring determined by the above control will be described with reference to FIG. 5. In the example shown in FIG. 5, the third drive unit 303 and the fourth motor 100 are connected and the fourth drive unit 303 and the third motor 100 are connected, which bring about miswiring between axes in the motor wirings 401 arising from non-corresponding connections between the drive units 303 and the motors 100. Corresponding phases are not connected to each other between the seventh drive unit 303 and the seventh motor 100, which brings about miswiring between phases in wirings of phases (U-phase, V-phase, W-phase) of the motor wirings 401. Furthermore, the encoder 102 of the fifth motor 100 and the sixth connector 311 are connected and the encoder 102 of the sixth motor 100 and the fifth connector 311 are connected, which bring about miswiring between axes arising from non-corresponding connections between the encoders 102 and the connectors 311. Assume basically that load machines connected to all the motors 100 have each a sufficiently small inertial mass so that the motors 100 can make a minute movement by a single magnetic pole position detection process.

In the multi-axis motor driving system 1 having such miswiring, when the integrated control unit 302 executes the content of control shown in FIG. 3, the first drive unit 303 and the second drive unit 303 are determined to be free from miswiring. As for the third drive unit 303, since the third drive unit 303 and the fourth motor 100 are wrongly connected, when the magnetic pole position detection process is carried out once via the third drive unit 303 (step S25), the fourth motor 100 makes a minute movement. When the minute movement is made, a detection signal is input from the encoder 102 of the fourth motor 100 to the fourth connector 311 of the relay unit 310, to be detected as a drive of the fourth motor 100. This is equivalent to the case that the motor 100 not corresponding to the drive unit 303 experiencing the magnetic pole position detection process has made a minute movement (NO at step S30, No at step S75), and hence, it is determined that the third drive unit 303 and the fourth motor 100 are wrongly connected or that the encoder 102 of the third motor 100 and the fourth connector 311 are wrongly connected (step S80), to display the fact (step S90). As a result, by checking the motor wiring 401 and the encoder wiring 402 corresponding to the third drive unit 303, the operator can locate that the third drive unit 303 and the fourth motor 100 are wrongly connected because the encoder wiring 402 is correctly arranged in this example.

Also in the case that any motor 100 including the fourth motor 100 has not made a minute movement due to a sufficiently large inertial mass of the load machine when the magnetic pole position detection process has been performed once via the third drive unit 303 (NO at step S30, or YES at step S75), a detection signal is input from the encoder 102 of the fourth motor 100 to the fourth connector 311 of the relay unit 310 when a position command of a predetermined drive amount based on the position feedback of the magnetic pole position θ is output to the third drive unit 303 (step S40), to be detected as a drive of the fourth motor 100. This is equivalent to the case that the motor 100 not corresponding to the drive unit 303 outputting the position command has been driven (NO at steps S45 and S100), and hence, it is determined that the third drive unit 303 and the fourth motor 100 are wrongly connected or that the encoder 102 of the third motor 100 and the fourth connector 311 are wrongly connected (step S80), to display the fact (step S90). As a result, the operator can locate that the third drive unit 303 and the fourth motor 100 are wrongly connected. Also as to the fourth drive unit 303, in the same manner, the operator can locate that the fourth drive unit 303 and the third motor 100 are wrongly connected.

On the other hand, as for the fifth drive unit 303, since the encoder 102 of the fifth motor 5 and the sixth connector 311 are wrongly connected, if the fifth motor 100 makes a minute movement when the magnetic pole position detection process has been carried out once via the fifth drive unit 303 (step S25), a detection signal is input from the encoder 102 of the fifth motor 100 to the sixth connector 311 of the relay unit 310, to be detected as a drive of the sixth motor 100. This is equivalent to the case that the motor 100 not corresponding to the drive unit 303 experiencing the magnetic pole position detection process has made a minute movement (NO at step S35, No at step S75), and hence, it is determined that the fifth drive unit 303 and the sixth motor 100 are wrongly connected or that the encoder 102 of the fifth motor 100 and the sixth connector 311 are wrongly connected (step S80), to display the fact (step S90). As a result, by checking the motor wiring 401 and the encoder wiring 402 corresponding to the fifth drive unit 303, the operator can locate that the encoder 102 of the fifth motor 100 and the sixth connector 311 are wrongly connected because the motor wiring 401 is correctly arranged in this example.

Also in the case that any motor 100 including the sixth motor 100 has not made a minute movement due to a sufficiently large inertial mass of the load machine when the magnetic pole position detection process has been performed once via the fifth drive unit 303 (NO at step S30, or YES at step S75), a detection signal is input from the encoder 102 of the fifth motor 100 to the sixth connector 311 of the relay unit 310 when a position command of a predetermined drive amount based on the position feedback of the magnetic pole position θ is output to the fifth drive unit 303 (step S40), to be detected as a drive of the sixth motor 100. This is equivalent to the case that the motor 100 not corresponding to the drive unit 303 outputting the position command has been driven (NO at steps S45 and S100), and hence, it is determined that the fifth drive unit 303 and the sixth motor 100 are wrongly connected or that the encoder 102 of the fifth motor 100 and the sixth connector 311 are wrongly connected (step S80), to display the fact (step S90). As a result, the operator can locate that the encoder 102 of the fifth motor 100 and the sixth connector 311 are wrongly connected. Also as to the sixth drive unit 303, in the same manner, the operator can locate that the encoder 102 of the sixth motor 100 and the fifth connector 311 are wrongly connected.

On the other hand, as to the seventh drive unit 303, since wiring of phases (U-phase, V-phase, W-phase) in the motor wiring 401 is wrongly made between the seventh drive unit 303 and the seventh motor 100, when the magnetic pole position detection process is performed once via the seventh drive unit 303 (step S25), the magnetic pole position θ and the motor position detected at the seventh connector 311 may not be coincident for the position after the minute movement of the seventh motor 100. If not coincident (NO at step S35), it is determined that miswiring between phases (in which while the phases are arrayed in the positive phase sequence, their entirety is positionally offset by one pin) is present in wiring of the phases in the motor wiring 401 of the seventh motor 100 (step S95), to display the fact (step S90). As a result, the operator can locate that miswiring is present in wiring of the phases in the motor wiring 401 of the seventh motor 100.

Since the type of the miswiring is miswiring of the type in which the phases are arrayed in the negative phase sequence with any one pin being correctly connected, the other two pins being reversely connected, even if the magnetic pole position θ and the motor position after minute movement detected at the seventh connector 311 coincide (YES at step S35), when a position command of a predetermined drive amount based on the position feedback of the magnetic pole position θ is output to the seventh drive unit 303 (step S40), the magnetic pole position θ and the motor position detected at the seventh connector 311 are by no means coincident (NO step S50), whereupon it is determined that miswiring between phases is present in the wiring of the phases in the motor wiring 401 of the seventh motor 100 (step S110), to display the fact (step S90). In this manner, each drive unit 303 is subjected to a further determination of miswiring between phases in the state where a predetermined amount of drive is made after the determination of miswiring between phases after minute movement, whereby the miswiring between phases can be determined twice for each of the drive units 303, so that the miswiring detection accuracy can be enhanced.

The encoder 102 corresponds to an example of means for detecting positions of the plurality of motors mechanically described in claims. The magnetic pole position detection unit 306 corresponds to an example of means for detecting positions of the plurality of motors electrically described in claims. The integrated control unit 302 and the axes control unit 304 correspond to an example of means for determining whether miswiring is present between the motor driving device and the motors based on a mechanical detection result and an electrical detection result described in claims.

In the multi-axis motor driving system 1 described hereinabove, if the drive units 303 provide a drive control such as feedback control based on the magnetic pole position θ, the drive units 303 can perform a surely proper drive control to the motors 100 connecting thereto. That is, even if any miswiring with wrong axis-to-axis corresponding relationship is present in either the motor wirings 401 or the encoder wirings 402, unintended motions of the motors 100 can be prevented. Furthermore, the feedback control based on the magnetic pole position θ has characteristics that, if miswiring between phases is present in a motor wiring 401, an unintended motion of the motor connecting to the motor wiring 401 can be suppressed. In this embodiment, when the integrated control unit 302 and the axes control unit 304 of the multi-axis motor driving device 300 determine whether miswiring is present in the motor wirings 401 and the encoder wirings 402, drive of the motor 100 is controlled using the magnetic pole position θ detected by the magnetic pole position detection unit 306, and it is determined whether miswiring is present based on the motor position detected by the encoder 102. As a result, the presence or absence of the miswiring can be determined while securely preventing the unintended motion of the motor 100.

Particularly, in this embodiment, the presence or absence of miswiring in at least one of the motor wirings 401 and the encoder wirings 402 is determined for each of the drive units 303, based on the magnetic pole position θ when the drive control of the motors 100 is performed with a command power fed in sequence via the drive units 303 to the motors 100 corresponding thereto and on the motor position from the encoders 102. This enables wiring in which further miswiring occurs to be definitely determined.

Particularly, in this embodiment, when the drive unit 303 starts a power supply to the motor 100, i.e., when a servo-on state takes place, a positioning control is provided that fixes (so-called servo-locks) the position of the motor 100 at a position upon the start of the power supply. This is because the position feedback control function possessed by the axes control unit 304 provides a drive control such that the position of the motor 100 at that point of time does not vary until a position command is input from the host control device 200, etc.

However, in the case that the servo-on state takes place by the feedback control based on the motor position detected by the encoder 102, if miswiring between axes is present in at least one of the motor wirings 401 and the encoder wirings 402 or if miswiring between phases is present in the motor wirings 401, a proper drive control cannot be provided to the motor 100, with the result that there appears an unstable state where that motor 100 undergoes an unintended drive in the servo-on state (the position varies) or the position easily varies.

In contrast, in the case that the servo-on state is provided by the position feedback control based on the magnetic pole position θ as in this embodiment, even if any miswiring between axes is present in either the motor wirings 401 or the encoder wirings 402 as described above, the unintended motion of that motor 100 in servo-on state can be prevented. Also in the case that miswiring between phases is present in the motor wirings 401, the unintended motion of that motor 100 can be suppressed.

On the contrary, it has been found that a minute motion inevitably occurs in the motor 100 when carrying out the magnetic pole position detection process to detect the magnetic pole position θ. This minute motion is a movement action within the expected range, unlike the unintended drive, and after the occurrence, a normally servo-clamped positioning state (first positioning control state) appears.

In the state where further positioning is made by the minute motion from the position upon the start of current supply in this manner, the magnetic pole position θ related to that minute motion and the motor position from the encoder 102 are referred to, whereby it can be determined whether miswiring is present in either the motor wirings 401 or the encoder wirings 402 while preventing the unintended motion of the motor 100.

Particularly, in this embodiment, when the drive unit 303 provides the positioning control state after the minute motion caused by the magnetic pole position detection process as described above, the positional movement of the motor 100 arising from the minute motion should be detected in comparison with the point of time to start that power supply. Thus, at the motor position detected from the encoder 102, the motor positions are compared between the point of time to start power supply and after the minute motion, and if a movement is not detected, it can be determined that miswiring between axes is present in either the motor wirings 401 or the encoder wirings 402.

Particularly, in this embodiment, when the drive unit 303 provides the positioning control state after the minute motion caused by the magnetic pole position detection process as described above, the positional movement of the motor 100 arising from the minute motion should be detected in comparison with the point of time to start that power supply. However, in the case that the motor 100 is a 3-phase AC motor for example and that the motor wirings 401 have miswiring between phases in which while phases are arrayed in the positive phase sequence U, V, W, their entirety is offset by one phase, the position of movement of the motor 100 due to the minute motion cannot accurately be detected by only the magnetic pole position θ obtained by the magnetic pole position detection process. Thus, the magnetic pole position θ and the motor position detected from the encoder are compared, and if not coincident, it can be determined that miswiring between phases is present in the motor wirings 401.

Particularly, in this embodiment, the presence or absence of miswiring can be determined in most cases by only the miswiring determination technique based on the minute motion after start of power supply as described above. However, if the load machine connected to each motor 100 has a large inertial mass, that motor 100 cannot experience the minute motion, and therefore the presence or absence of miswiring may not be determined.

In contrast, in this embodiment, the motor 100 is further driven by a predetermined amount after the execution of determination of the miswiring based on the minute motion after the start of power supply, to bring about the state where the drive unit 303 is positioned, and the magnetic pole position θ related to the positional movement due to the predetermined amount of drive and the motor position from the encoder 102 are referred to so that the presence or absence of miswiring in either the motor wirings 401 or the encoder wirings 402 can be determined in more detail.

On the contrary, in the case of performing the positioning control to drive the motor 100 by a predetermined amount via the drive unit 303, that drive unit 303 needs to perform the position feedback control based on any position detection information at the same time. Thus, in this embodiment, in the case of driving the motor 100 by a predetermined amount from the position positioned after the minute movement for the purpose of detecting miswiring, the state is provided where the positioning control is given by the feedback control based on the magnetic pole position θ. This enables the unintended motion of that motor 100 to be prevented when driving the motor 100 a predetermined amount, even if any miswiring between axes is present in either the motor wirings 401 or the encoder wirings 402 as described above. Even if miswiring between phases is present in the motor wirings 401, the unintended motion of that motor 100 can be suppressed.

Particularly, in this embodiment, as described above, when the drive unit 303 provides the positioning state in which the motor 100 is driven a predetermined amount by the feedback control of the magnetic pole position θ, the positional movement of the motor 100 caused by the predetermined amount of drive should be detected in comparison with the existing positioning state after minute motion. Thus, at the motor position from the encoder 102, the motor positions are compared between after the minute motion and after the predetermined amount of drive, and if no movement is detected, it can be determined that miswiring between axes is present in either the motor wirings 401 or the encoder wirings 402. According to this determination technique, the presence or absence of the miswiring between axes can accurately be determined even when the minute motion was impossible due to large inertial mass of the load machine.

Particularly, in this embodiment, as described above, when the drive unit 303 provides the positioning state after the predetermined of amount of drive, the positional movement of the motor 100 due to the predetermined amount of drive should be detected in comparison with the existing positioning state after minute motion. In the case that the motor 100 is the 3-phase AC motor 100 and that the motor wirings 401 have miswiring between phases in which the phases are arranged in the negative phase sequence such as W, V, U, the position of movement of the motor 100 due to the predetermined amount of drive cannot accurately be detected using the magnetic pole position θ obtained by the magnetic pole position detection process (because of moving in reverse rotation). Thus, the magnetic pole position θ and the motor position from the encoder 102 are compared, and if not coincident, it can be determined that miswiring between phases is present in the motor wirings 401.

In the case that the motor wirings 401 have miswiring between phases in which the phases are arrayed in the negative phase sequence W, V, U as described above, a wrong determination may result by using the miswiring between phases determination technique based on the minute motion after the start of power supply described above, but this miswiring between phases determination technique based on the predetermined amount of drive can make an accurate determination.

Particularly, in this embodiment, since the motors 100 are each the permanent magnet synchronous motor, the magnetic pole position detection process effected by the magnetic pole position detection unit 306 of the drive unit 303 can be performed securely at a high accuracy.

Particularly, in this embodiment, the magnetic pole position detection process of the magnetic pole position detection unit 306 includes detecting the position of the motor 100, based on the inductance deviation between the d-axis and the q-axis due to the magnetic saliency of the permanent magnet synchronous motor, whereupon the magnetic pole position detection process can be performed securely at a high accuracy.

Although in the above embodiment, description has been given of the configuration and the technique for determining the miswiring between axes and the miswiring between phases in the multi-axis motor driving system 1 and the multi-axis motor driving device 300 that control the drive of the plurality of motors 100, this is not limitative. Otherwise, although not shown in particular, similar configuration and technique may be employed to determine the miswiring between phases in a motor driving system and a motor driving device that control the drive of a single motor.

Further, in addition to matters described above, techniques by the embodiment and each of the modified examples may be combined suitably and utilized. In addition, although not exemplified point by point, the embodiment and each of the modified examples will be brought into practice after the addition of various changes in the range that does not deviate from the purport thereof.

What is claimed is:
1. A motor driving system comprising:
  a motor with an encoder; and
  a motor driving device configured to control and drive the motor based on a motor control command, the motor driving device comprises:
    a drive unit configured to supply power to and drive the motor; and
    a control unit configured to control the motor driving device,
  wherein the control unit comprises a first position detection unit configured to perform a magnetic pole position detection process for the motor to detect a position of the motor, the magnetic pole position detection process includes driving the motor based on a predetermined voltage command and calculating a magnetic pole position of the motor, and
  wherein the control unit determines that miswiring between the motor driving device and the motor is present in a case where a first detection result of the first position detection unit and a second detection result of the encoder do not coincide in a first positioning control state, the first positioning control state is a state where the motor is further positioned by a minute motion caused by execution of the magnetic pole position detection process from a state where the motor is positioned at a position at the point of time of start of power supply based on a position command corresponding to a drive amount 0 received by the drive unit by a feedback control based on the magnetic pole position.

2. The motor driving system according to claim 1, wherein:
the control unit determines that miswiring between phases is present in motor wirings connecting the motor driving device and the motor in a case where the first detection result and the second detection result do not coincide in the first positioning control state.

3. The motor driving system according to claim 2, wherein:
the control unit determines whether miswiring is present based on the first detection result and the second detection result in a second positioning control state, the second positioning control state is a state where the motor is positioned at a position driven a predetermined amount by a feedback control based on the magnetic pole position from a position in the first positioning control state.

4. The motor driving system according to claim 3, wherein:
the control unit determines that miswiring between phases is present in the motor wirings in a case where the first detection result and the second detection result do not coincide in the second positioning state.

5. A motor driving device configured to control and drive a motor with an encoder based on a motor control command, the motor driving device comprising:
a drive unit configured to supply power to and drive the motor; and
a control unit configured to control the motor driving device,
wherein the control unit comprises a first position detection unit configured to perform a magnetic pole position detection process for the motor to detect a position of the motor, the magnetic pole position detection process includes driving the motor based on a predetermined voltage command and calculating a magnetic pole position of the motor, and
wherein the control unit determines that miswiring between the motor driving device and the motor is present in a case where a first detection result of the first position detection unit and a second detection result of the encoder do not coincide in a first positioning control state, the first positioning control state is a state where the motor is further positioned by a minute motion caused by execution of the magnetic pole position detection process from a state where the motor is positioned at a position at the point of time of start of power supply based on a position command corresponding to a drive amount 0 received by the drive unit by a feedback control based on the magnetic pole position.

6. A multi-axis motor driving system comprising:
a plurality of motors; and
a multi-axis motor driving device configured to drive the plurality of motors based on a motor control command, the multi-axis motor driving device including:
a plurality of drive units connected correspondingly to the plurality of motors, respectively; and
a control unit configured to control a whole of the multi-axis motor driving device,
wherein the control unit includes a first position detection unit configured to perform a magnetic pole position detection process for the motors connected to the control unit to detect positions of the motors, the magnetic pole position detection process includes driving the motor based on a predetermined voltage command and calculating a magnetic pole position of the motor,
wherein each of the plurality of motors includes a second position detection unit configured to detect a position of the motor via a mechanical linkage, and
wherein the control unit determines that miswiring between the multi-axis motor driving device and the motor is present in a case where a first detection result of the first position detection unit and a second detection result of the second position detection unit do not coincide in a first positioning control state, the first positioning control state is a state where the motor is further positioned by a minute motion caused by execution of the magnetic pole position detection process from a state where the motor is positioned at a position at the point of time of start of power supply based on a position command corresponding to a drive amount 0 received by the drive unit by a feedback control based on the magnetic pole position.

7. The multi-axis motor driving system according to claim 6, wherein:
the multi-axis motor driving device includes a plurality of signal input units correlated respectively with the plurality of the drive units and further correlated and connected respectively with a plurality of the second position detection units, and
based on the first detection result of the drive unit when a command power is fed via the drive unit to the plurality of motors in sequence and on the second detection result input to the signal input unit corresponding to the drive unit, the control unit determines for each of the drive units whether miswiring is present in at least one of motor wirings connecting the drive units and the motors and signal input unit wirings connecting the signal input units receiving the second detection result and the second position detection units.

8. The multi-axis motor driving system according to claim 7, wherein:
the control unit determines that miswiring between axes is present in at least one of the motor wirings and the signal input unit wirings in a case where a movement from the position at the current supply start point of time is not detected based on the second detection result corresponding to the drive unit put into the first positioning control state.

9. The multi-axis motor driving system according to claim 8, wherein:
the control unit determines that miswiring between phases is present in the motor wirings in a case where the first detection result and the second detection result each corresponding to the drive unit put into the first positioning control state do not coincide.

10. The multi-axis motor driving system according to claim 9, wherein:
the control unit determines whether miswiring is present based on the first detection result and the second detection result after putting the drive unit into a second positioning control state, the second positioning control state is a state where the motor corresponding to the drive unit is positioned at a position driven a predetermined amount by a feedback control based on the magnetic pole position from a position in the first positioning control state.

11. The multi-axis motor driving system according to claim 10, wherein:
the control unit determines that miswiring between axes is present in at least one of the motor wirings and the signal input unit wirings in a case where a movement from the position in the first positioning control state is not detected based on the second detection result corresponding to the drive unit put into the second positioning control state.

12. The multi-axis motor driving system according to claim 11, wherein:
the control unit determines that miswiring between phases is present in the motor wirings in a case where the first detection result and the second detection result each corresponding to the drive unit put into the second positioning control state do not coincide.

13. The multi-axis motor driving system according to claim 12, wherein:
each of the plurality of motors is a permanent magnet synchronous motor.

14. The multi-axis motor driving system according to claim 13, wherein:
the magnetic pole position detection process of the first position detection unit includes detecting a position of the motor based on an inductance deviation between a d-axis and a q-axis due to a magnetic saliency of the permanent magnet synchronous motor.

15. A multi-axis motor driving device configured to drive a plurality of motors based on a motor control command, the multi-axis motor driving device comprising:

a plurality of drive units connected correspondingly to the plurality of motors, respectively; and
a control unit configured to control a whole of the multi-axis motor driving device,
wherein the control unit includes a first position detection unit configured to perform a magnetic pole position detection process for the motors connected to the control unit respectively to detect a position of the motors, the magnetic pole position detection process includes driving the motor based on a predetermined voltage command and calculating a magnetic pole position of the motor,
wherein each of the plurality of motors includes a second position detection unit configured to detect a position of the motor via a mechanical linkage, and
wherein the control unit determines that miswiring between the multi-axis motor driving device and the motor is present in a case where a first detection result of the first position detection unit and a second detection result of the second position detection unit do not coincide in a first positioning control state, the first positioning control state is a state where the motor is further positioned by a minute motion caused by execution of the magnetic pole position detection process from a state where the motor is positioned at a position at the point of time of start of power supply based on a position command corresponding to a drive amount 0 received by the drive unit by a feedback control based on the magnetic pole position.

* * * * *